United States Patent [19]

LaPensee

[11] Patent Number: 4,974,705
[45] Date of Patent: Dec. 4, 1990

[54] ELECTROMAGNETIC FRICTION BRAKE WITH IMPROVED MOUNTING PINS

[75] Inventor: Michael L. LaPensee, Roscoe, Ill.

[73] Assignee: Dana Corporation, Toledo, Ohio

[21] Appl. No.: 451,609

[22] Filed: Dec. 18, 1989

[51] Int. Cl.$^5$ .......................... B60L 7/00; H01F 7/06
[52] U.S. Cl. .................................. 188/163; 188/138;
188/72.1; 192/84 C; 335/219; 335/266
[58] Field of Search ...................... 188/72.1, 161, 163,
188/138, 137, 73.45; 192/84 C; 335/219, 266,
209; 310/77

[56] References Cited

U.S. PATENT DOCUMENTS

| | | | |
|---|---|---|---|
| 3,446,322 | 5/1969 | Wrensch | 188/163 X |
| 3,734,245 | 5/1973 | Hubbard | 188/163 |
| 4,014,412 | 3/1977 | Swanson et al. | 188/161 X |
| 4,135,607 | 1/1979 | Brown et al. | 188/138 X |
| 4,172,242 | 10/1979 | Myers et al. | 335/209 |
| 4,216,849 | 8/1980 | Neill | 188/163 X |
| 4,228,874 | 10/1980 | Brinkmann et al. | 188/72.1 |
| 4,344,056 | 8/1982 | Kroeger et al. | 335/219 |
| 4,718,523 | 1/1988 | Scheider et al. | 188/161 |
| 4,804,075 | 2/1989 | Koitabashi | 192/84 C |

Primary Examiner—Douglas C. Butler
Attorney, Agent, or Firm—Leydig, Voit & Mayer

[57] ABSTRACT

An electromagnetic friction brake in which a friction pad on an electromagnet frictionally engages a rotating armature disc when the electromagnet is excited. The electromagnet is attached to a fixed mounting member by a pair of pins which project into holes in the electromagnet. The pins and holes are arranged such that one pin sustains all of the angular thrust which is imposed on the electromagnet by the armature while the other pin sustains no angular thrust and serves to retain the electromagnet radially of the armature. Such an arrangement of the pins serves to reduce accelerated wear which otherwise occurs at the leading edge portion of the friction pad.

4 Claims, 2 Drawing Sheets

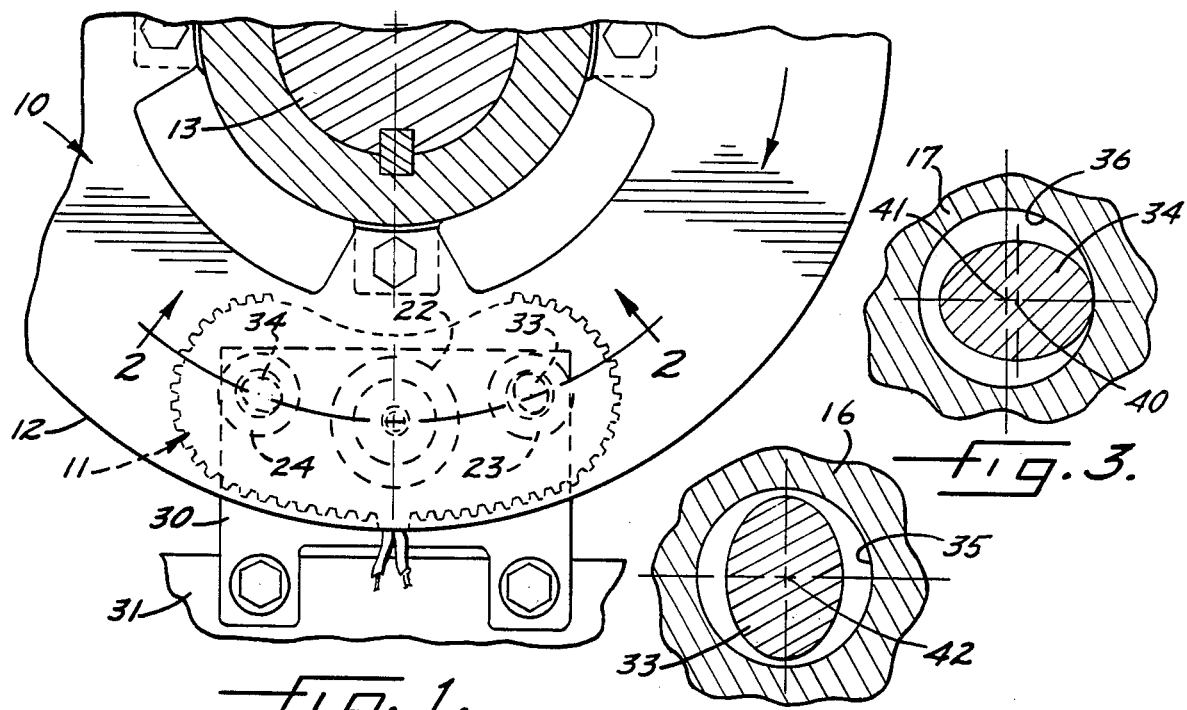
Fig. 1.
Fig. 3.
Fig. 4.
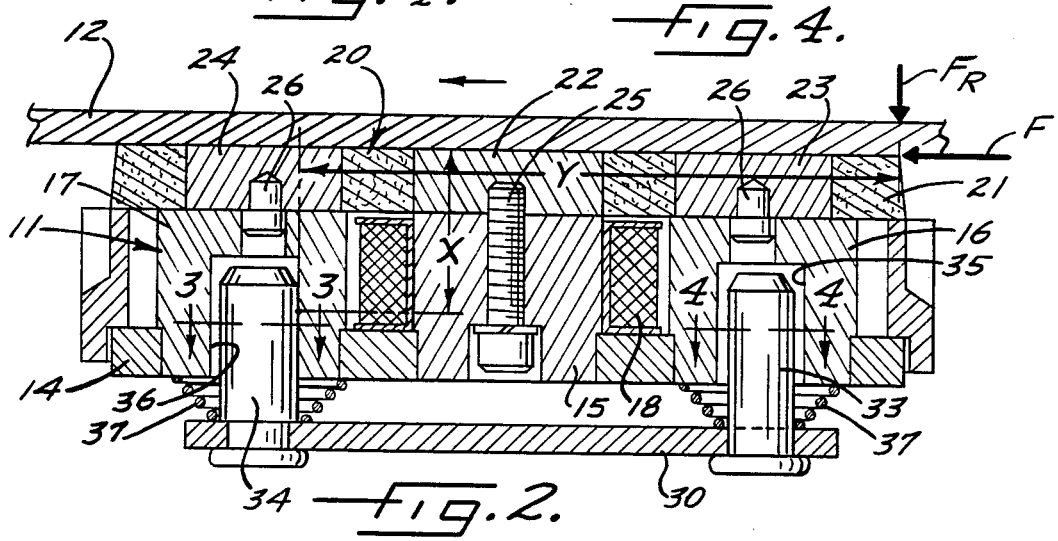
Fig. 2.
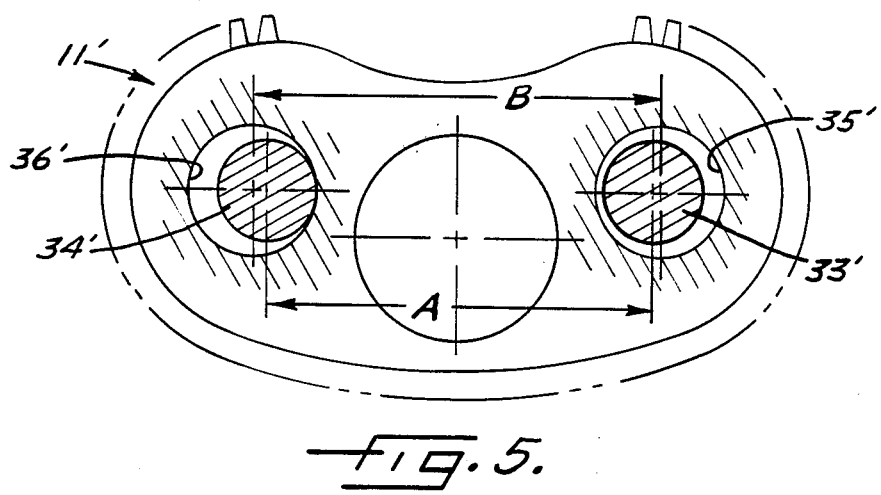
Fig. 5.

ELECTROMAGNETIC FRICTION BRAKE WITH IMPROVED MOUNTING PINS

BACKGROUND OF THE INVENTION

This invention relates to an electromagnetic friction brake and, more particularly, to a brake of the same general type as disclosed in Kroeger et al U.S. Pat. No. 4,344,056.

Such a brake includes an electromagnet having a friction pad which is adapted to engage and retard a rotary disc when the electromagnet is excited The electromagnet is supported on a fixed mounting member by a pair of pins which project into holes in the electromagnet. The pins are spaced from one another in a direction extending generally angularly of the disc and support the electromagnet against movement radially of the disc. When the brake is engaged, the pins sustain the angular thrust which is exerted on the electromagnet by virtue of the disc acting against the friction pad.

In prior brakes of this type, the friction pad tends to wear unevenly and is subjected to heavier wear at its leading edge, that is, the edge which is first contacted by the disc when the disc is rotated in a normal predetermined direction. As a result, the leading edge portion of the pad develops a generally wedge-like configuration and this reduces the service life of the brake.

SUMMARY OF THE INVENTION

The general aim of the present invention is to provide a new and improved brake of the foregoing type in which wear is more uniformly distributed along the friction pad thereby to enable the brake to operate effectively over a longer period of time.

A more detailed object of the invention is to achieve the foregoing through uniquely arranged mounting pins which reduce the force applied to the leading edge portion of the friction pad by the disc and thereby decrease the wear experienced by the leading edge portion.

In a still more specific sense, the invention resides in a brake in which one of the mounting pins sustains all of the angular thrust exerted on the electromagnet while the other pin helps retain the magnet radially and sustains no angular thrust.

These and other objects and advantages of the invention will become more apparent from the following detailed description when taken in conjunction with the accompanying drawings.

BRIEF DESCRIPTION OF THE DRAWINGS

FIG. 1 is a fragmentary front elevational view of one embodiment of a new and improved electromagnetic friction brake incorporating the unique features of the present invention.

FIG. 2 is an enlarged fragmentary cross-section taken substantially along the line 2—2 of FIG. 1.

FIGS. 3 and 4 are enlarged fragmentary cross-sections taken substantially along the lines 3-3 and 4-4, respectively, of FIG. 2.

FIG. 5 is a fragmentary front elevational view of another embodiment of a brake constructed in accordance with the principles of the invention, certain parts being broken away and shown in section.

DETAILED DESCRIPTION OF THE PREFERRED EMBODIMENTS

Figure 6:
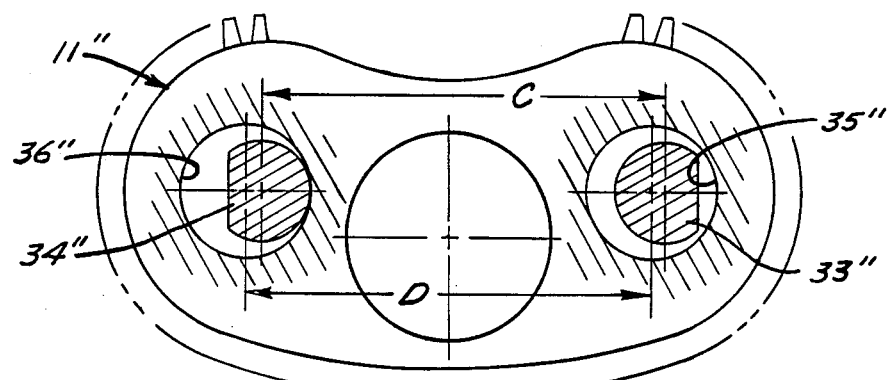
FIG. 6 is a view similar to FIG. 5 but shows yet another embodiment.

As shown in the drawings for purposes of illustration, the invention is embodied in an electromagnetic friction brake 10. The brake includes an electromagnet 11 and further includes a circular disc or armature 12 which is made of steel and which is adapted to be rotated by a power-driven shaft 13. When excited, the electromagnet 11 frictionally engages and retards the armature 12. In this particular instance, the brake 10 is a tension brake of the type which is used in textile machines When the magnet 11 is excited, it does not completely stop the armature but instead applies a retarding force thereto in order to control the speed of the shaft 13.

For the most part, the electromagnet 11 is of the same construction as disclosed in Kroeger et al U.S. Pat. No. 4,344,056 and thus will be described only briefly. The magnet includes a flat plate 14 (FIG. 2) stamped from sheet steel and supporting a center stud 15 and two outboard studs 16 and 17 which are made of steel or other low reluctance material. Telescoped over the center stud is an electrical coil 18 for producing magnetic flux. When the coil is energized by a voltage source, the center stud 15 forms a magnetic pole of one polarity while the two outboard studs 16 and 17 form magnetic poles of the opposite polarity Magnetic flux threads two paths with each path extending from the center stud 15 across to the armature 12, reversely to one of the outboard studs 16, 17 and then back to the center stud by way of the plate 14. Such flux attracts the electromagnet to the armature and causes a friction face 20 on the magnet to retard rotation of the armature The friction face 20 is formed by a sheet 21 (FIG. 2) of friction material (e.g., brake lining) and by low reluctance steel inserts 22, 23 and 24 which are molded in place in the friction material and which form pole faces for the studs 15, 16 and 17, respectively. A screw 25 fastens the center insert 22 to the stud 15 while dowels 26 locate the inserts 23 and 24 relative to the studs 16 and 17.

To support the magnet 11, a mounting member or bracket 30 (FIG. 1) is anchored in a fixed position on a stationary frame 31. Two pins 33 and 34 (FIG. 2) are fixed to the mounting bracket 30 and project into holes 35 and 36 formed in the studs 16 and 17, respectively. Coil springs 37 are telescoped over the pins between the plate 14 and the bracket 30 and lightly urge the magnet 11 toward the armature 12.

According to the present invention, the mounting pins 33 and 34 and the holes 35 and 36 are arranged such that one of the pins sustains all of the angular thrust which is imposed on the electromagnet 11 by the armature 12 while the other pin is used solely for radial retention and sustains no angular thrust. As will become more apparent subsequently, the distribution of the load on the pins in such a manner reduces uneven wear of the friction pad 21 and causes the pad to wear more uniformly along its length so that the pad experiences a longer service life.

In the embodiment of the invention shown in FIGS. 1 to 3, the holes 35 and 36 are circular in cross-section but the pins 33 and 34 are elliptical in cross-section. When the normal direction of rotation of the armature 12 is clockwise (FIG. 1), the pin 33 is oriented in the hole 35 such that the long dimension of the ellipse defined by the pin 33 extends generally radially of the armature. In contrast, the pin 34 is oriented in the hole 36 in such a position that the long dimension of its elliptical shape extends generally angularly of the armature Hereafter, the pin 33 shall be referred to as the "lead" pin since, when the armature is rotated in its normal clockwise direction, a given point on the armature passes by the pin 33 before passing between the pins and then passing by the pin 34. The latter pin shall be referred to as being the "lag" pin.

As shown most clearly in FIG. 3, the lag pin 34 is positioned in the hole 36 such that its axis 40 is angularly offset from the axis 41 of the hole in a direction generally opposite to the direction of rotation of the armature 12. The lead pin 33, however, is located with its axis 42 generally coinciding with the axis of the hole 35 (see FIG. 4). With this arrangement, the "lag" side of the hole 36 bears against the lag pin 34 and causes angular thrust exerted on the electromagnet 11 by the armature 12 to be transmitted to that pin. Such engagement holds the "lag" side of the hole 35 in engagement with the lead pin 33 to avoid the imposition of angular thrust on the lead pin. Due to its elliptical shape and angular orientation, however, the lead pin 33 may engage the hole 35 to restrain the electromagnet radially of the armature.

A modified electromagnet 11' is illustrated in FIG. 5 in which parts corresponding to those of the first embodiment are indicated by the same but primed reference numerals. In the embodiment of FIG. 5, the pins 33' and 34' are of circular cross-section as are the holes 35' and 36' but the pins are significantly smaller in diameter than the holes Moreover, the pins are eccentric with respect to the holes such that the spacing A between the pins is less than the spacing B between the holes Thus, when the armature 12 is rotated clockwise, the "lag" side of the hole 36' engages the lag pin 34' and holds the "lag" side of the hole 35' out of engagement with the lead pin 33'. As before, the angular thrust is sustained by the lag pin 34' while the lead pin 33' provides radial retention and is not subjected to angular thrust.

By sustaining the angular thrust solely with the lag pin 34, 34', wear at the leading edge (i.e., the right-hand edge in FIG. 2) of the friction pad 21 where the armature 12 first contacts the pad is significantly reduced. To demonstrate, the reaction force $F_R$ acting against the leading edge of the friction pad is equal to:

$$\frac{(F)(X)}{Y}$$

where:
F is the shear force acting on the leading edge of the friction pad;
X is the distance between the point of application of the shear force and an arbitrary contact point on a pin 33, 33' or 34, 34'; and
Y is the distance between the point of the reaction force $F_R$ and the contact point.

By making the contact point on the lag pin 34, 34' and thus making the value of Y large, the reaction force $F_R$ against the leading edge of the pad 21 is small as compared to a case where the contact point is on the lead pin 33, 33' and the value of Y is small. Because the reaction force is small, accelerated wear which otherwise occurs at the leading edge of the pad is reduced in order to distribute the wear more uniformly along the pad and thereby increase the service life of the pad.

It will be appreciated that, if the normal direction of rotation is counterclockwise, the pins will be arranged opposite to what has been shown so as to cause all of the angular thrust to be sustained by the pin 33, 33'.

FIG. 6 shows an arrangement which is preferred in applications where the armature 12 rotates both clockwise and counterclockwise. In the brake 11" shown in FIG. 6, each of the pins 33" and 34" is generally D-shaped but the pins face in circumferentially opposite directions with the flat side of each pin facing toward the adjacent end of the magnet. The diameter of the pins is smaller than the diameter of the holes 35" and 36" but the spacing C between the pins is equal to the spacing D between the holes.

As before, clockwise rotating of the armature 12 results in the "lag" side of the hole 36" engaging the lag pin 34" and, because of the flat relief in the lead pin 33", the "lag" side of the hole 35" is held out of engagement with the lead pin. If the armature is rotated counterclockwise, the hole 35" angularly engages the round side of the pin 33" but the hole 36" is prevented from exerting angular thrust on the flat side of the pin 34". The pin which does not resist the angular thrust provides radial retention.

I claim:

1. A electromagnetic friction brake comprising (A) a disc defining an armature and adapted to be normally rotated in a predetermined direction, (B) a mounting member fixed in a stationary position relative to said disc and (C) an electromagnet attached to said mounting member and having a brake pad adapted to engage one face of said disc and frictionally retard rotation of said disc when said electromagnet is in a predetermined state of excitation, said electromagnet having first and second holes therein, said holes being spaced angularly from one another with respect to said disc whereby a given point on said disc moves past said first hole, between said first hole and said second hole and then past said second hole when said disc rotates in said predetermined direction, first and second pins projecting from said mounting member and into said first and second holes, respectively, to attach said electromagnet to said mounting member, said first pin being engageable with said first hole to resist radial thrust acting on said electromagnet in a direction radially of said disc, and said second pin being engageable with said second hole to (a) resist angular thrust acting on said electromagnet in a direction angularly of said disc, and (b) prevent said first hole and said first pin from resisting such angular thrust when said disc is rotated in said predetermined direction.

2. A brake as defined in claim 1 in which said holes are circular in cross-section, each of said pins being generally elliptical in cross-section, the long axis of the ellipse defined by said first pin extending generally radially of said disc, and the long axis of the ellipse defined by said second pin extending generally angularly of said disc.

3. A brake as defined in claim 1 in which said holes and said pins are circular n cross-section, said pins and said holes being so sized and located that one side of said second hole engages one side of said second pin when said disc is rotated in said predetermined direction and holds the corresponding side of said first hole out of engagement with said first pin.

4. A brake as defined in claim 1 in which said holes are generally circular in cross-section, said pins being generally D-shaped in cross-section and each having a round side and a relieved side, said pins being so oriented and located that (A) one side of said second hole engages the round side of said second pin when said disc is rotated in said predetermined direction and holds the corresponding side of said first hole out of engagement with the relieved side of said first pin, and (B) one side of said first hole engages the round side of said first pin when said disc is rotated opposite to said predetermined direction and holds the corresponding side of said second hole out of engagement with the relieved side of said second pin.

* * * * *